United States Patent [19]

Schindel

[11] 4,157,661
[45] Jun. 12, 1979

[54] FLOWMETERS

[75] Inventor: Milton R. Schindel, Peterborough, Canada

[73] Assignee: Milltronics Limited, Peterborough, Canada

[21] Appl. No.: 884,755

[22] Filed: Mar. 7, 1978

[51] Int. Cl.² .............................................. G01F 1/30
[52] U.S. Cl. ...................................................... 73/228
[58] Field of Search ........................................ 73/228

[56] References Cited

U.S. PATENT DOCUMENTS

| 2,897,672 | 8/1959 | Glasbrenner et al. | 73/228 |
| 3,147,620 | 9/1964 | Stapler | 73/228 |
| 3,340,733 | 9/1967 | Lasher | 73/228 |
| 3,380,299 | 4/1968 | Seymour | 73/228 |
| 3,424,000 | 1/1969 | Chelner et al. | 73/228 |
| 3,557,616 | 1/1971 | Landon, Jr. | 73/228 |
| 3,640,135 | 2/1972 | Tomiyasu et al. | 73/228 |
| 3,650,340 | 3/1972 | Bradley | 177/136 |
| 3,742,762 | 7/1973 | Tomiyasu | 73/228 |
| 3,878,714 | 4/1975 | Protta | 73/189 |
| 3,908,458 | 9/1975 | Pannullo et al. | 73/228 |
| 4,067,238 | 1/1978 | Oetiker | 73/228 |
| 4,069,709 | 1/1978 | Volk et al. | 73/228 |

FOREIGN PATENT DOCUMENTS

| 830211 | 3/1960 | United Kingdom | 73/228 |
| 1066568 | 4/1967 | United Kingdom | 73/228 |
| 233268 | 4/1969 | U.S.S.R. | 73/228 |

Primary Examiner—Herbert Goldstein
Attorney, Agent, or Firm—Ridout & Maybee

[57] ABSTRACT

An inclined plate type flowmeter measures the horizontal reaction resulting from solids striking the plate by using strain gauges to detect deflection of a beam supporting the plate. The difference of the outputs of two such flowmeters at the top and bottom of a vertical section of conduit carrying air entrained solids provides an output proportional to the flow rate of the solids.

8 Claims, 5 Drawing Figures

SUBTRACTING AND MEASURING CIRCUIT

FLOWMETERS

FIELD OF THE INVENTION

This invention relates to flowmeters intended for measuring the flow of a solid material through a duct, of the type in which the reaction forces developed as a result of impingement of the solid on a plate in the duct are measured.

REVIEW OF THE PRIOR ART

In known flowmeters of the above type, an inclined or dihedral deflection plate is mounted in the duct for pivotal or translational movement against the bias of a spring or springs, and deflection of the plate is sensed by a suitable transducer. In a preferred arrangement described in U.S. Pat. No. 3,640,135 issued Feb. 8, 1972, the horizontal component of the force applied to an inclined plate is sensed, since this avoids the inaccuracies which can occur when the vertical component is sensed, due to the weight of material lodging on the plate. This patent describes means to sense either pivotal or translational movement of an arm supporting the plate, and a further U.S. Pat. No. 3,742,762 issued to Tomiyasu on July 3, 1973 describes a meter in which the deflection plate is supported on a parallel linkage.

The material whose flow is being metered is often very dusty, and in some case may contain lumps or foreign bodies. On the other hand, for accurate metering, it is important that frictional losses in the bearings supporting the arm carrying the plate and other extraneous forces be reduced to an absolute minimum. In practice, compromise solutions are necessary in sealing the bearings from dust without using sealing members which themselves may apply significant forces to the arm, whilst providing bearings which are robust enough to stand up to normal operating conditions without introducing excessive friction.

Flowmeters are also known in which the deflection of a probe by a fluid passing over or through it is measured. Examples of such arrangements are to be found in U.S. Pat. Nos. 2,897,672 (Glasbrenner, et al), 3,147,620 (Stapler), 3,424,000 (Chelner, et al) and 3,908,458 (Panullo, et al). These meters are all intended for fluids, and are unsuitable for metering the flow of solids. Thus the deflection members will only intercept a small part of the flow through a conduit, whilst the Glasbrenner arrangement would probably clog if used with solids. The FIG. 3 and FIG. 4 embodiment of the Seymour patent is necessarily so arranged that much of the area of the sensing plate is masked by structure which would restrict impingement of a solid on the plate. U.S. Pat. No. 3,557,616 (London) discloses a flow sensor for particulate material using a flexible probe, but this makes no preference to being a meter, or to provide accurate sensing of the rate of flow of the solids being detected. Moreover, with the possible exception of Seymour, none of the above patents disclose devices which are capable of sensing a component of force perpendicular to the direction of flow. Seymour, in his FIGS. 3 and 4, shows a device which will react indiscriminately to force components both parallel and perpendicular to the flow direction.

It is also widely known to use strain gauges as transducers in weighing equipment for solids. In one such arrangement, described in U.S. Pat. No. 3,650,340 issued Mar. 21, 1972 to Bradley, strain gauges are applied in opposed pairs to spaced points on a beam forming an axle or drawbar of a vehicle, and are connected in a bridge formation to indicate the vertical loading applied to the axle or drawbar whilst indications due to other force components cancel. Such bridge-connected strain gauges are also employed in some of the flow meters discussed above, for example the Panullo, et al. and Chelner, et al patents.

However, to the best of my belief, no proposal has been made for a flowmeter for particulate solids which both overcomes the problems of material adhering to the sensor plate, and also eliminates the need for elaborate bearings and dust shields. Additionally, existing flowmeters of the type under discussion have not been suitable for measuring the rate of flow of air or gas entrained solids, due to an inability to distinguish between forces due to the gas and forces due to the solids.

According to the invention, a flowmeter for particulate solids comprises a housing connected to a duct through which particulate solids may pass, the housing being of larger cross-section than the duct, at least one plate placed in the housing so as to lie in the path of solids entering the housing through the duct, the at least one plate being inclined relative to the axis of the duct, a beam extending parallel to the plane of the at least one plate and perpendicular to the direction of movement of the solids, said beam supporting the at least one plate within the housing and being fixedly supported with respect to the latter, and a system comprising at least one strain gauge mounted on said beam and responsive to bending strains in the latter corresponding to stresses acting in a plane perpendicular to the direction of movement of solids. Preferably the beam supports the plate in cantilever fashion from a rigid mounting, and the strain gauges are in spaced pairs on opposite side faces of the beam lying in planes parallel to the direction of motion of the solids entering the meter and are connected as a bridge.

The above arrangement requires no bearings, nor do any moving parts need to pass through the housing whilst the beam may be as strong as may be required; it is therefore simple and robust. It is also compact, since the strain gauges, which form the transducer elements, can be within the housing, and no additional casing outside the housing is required to accommodate the transducer and the mechanical linkage thereto.

In a further aspect, the invention relates to a flowmeter for gas entrained solids, comprising a horizontal conduit, a vertical conduit, a first housing of enlarged cross-section relative to said upper horizontal conduit connecting the upper horizontal conduit and the upper end of vertical conduit, a second housing of enlarged cross-section relative to said vertical conduit and connecting with the lower end of said vertical conduit, at least one deflection plate supported in said first housing and inclined so as to intercept solids entering the housing from the horizontal conduit and deflect them in a direction perpendicular to said horizontal and vertical conduits, at least one deflection plate supported in said second housing and inclined so as to intercept solids entering the housing and deflect them in a direction perpendicular to said vertical conduit, means to sense the magnitude of the horizontal reaction developed at the at least one deflection plate in the upper housing, means to sense the magnitude of the horizontal reaction developed at the at least one deflection plate in the lower housing, and means to measure the difference between said magnitudes.

Further features of the invention will become apparent from the following description of preferred embodiments thereof.

SHORT DESCRIPTION OF THE DRAWINGS

In the drawings:

FIG. 1 is a perspective view, partially broken away, showing a flowmeter in accordance with the invention, FIG. 2 is view showing a modified sensor plate arrangement, FIG. 3 shows the basic electrical circuit of the flowmeter of FIG. 1, FIG. 4 is a diagrammatic vertical section showing how two flowmeters may be utilized to measure the rate of flow of an air or gas entrained particulate solid, and FIG. 5 is a diagrammatic plan view of the arrangement of FIG. 4.

DESCRIPTION OF THE PREFERRED EMBODIMENTS

Figure 1:
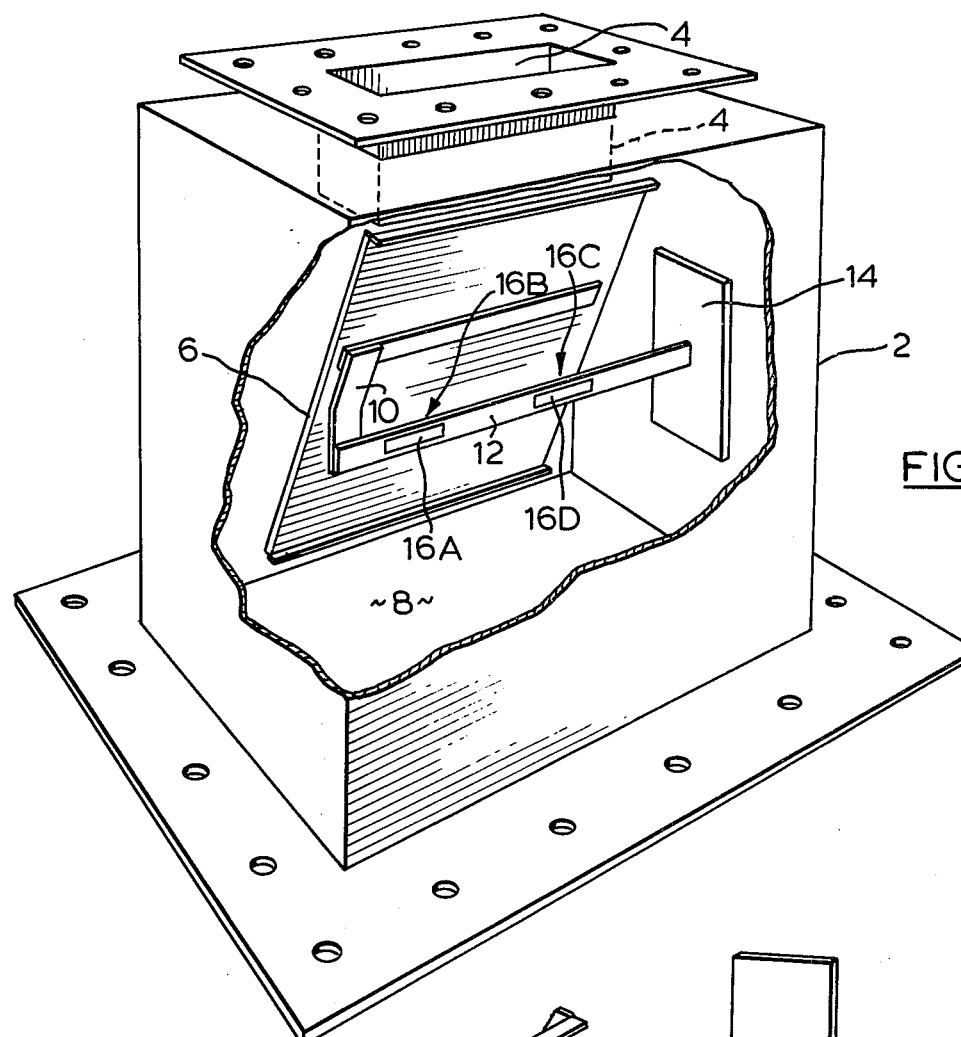

Referring to FIG. 1, a flowmeter for particulate solids comprises a box-like housing 2 with a top entrance guide 4 for connection to a conduit from which flows the material to be metered. Located within the housing beneath the entrance guide so as to intercept the material entering the housing is an inclined plate 6, the angle of inclination of the plate being sufficient to minimize any tendency of the material to lodge on it. The housing is large enough to provide ample clearance around the plate for the material to fall freely from it through the open bottom and of the housing. The material falling on the plate 6 will be deflected laterally, and thus a horizontal reaction component will be developed at the plate in addition to a vertical component.

Figure 3:
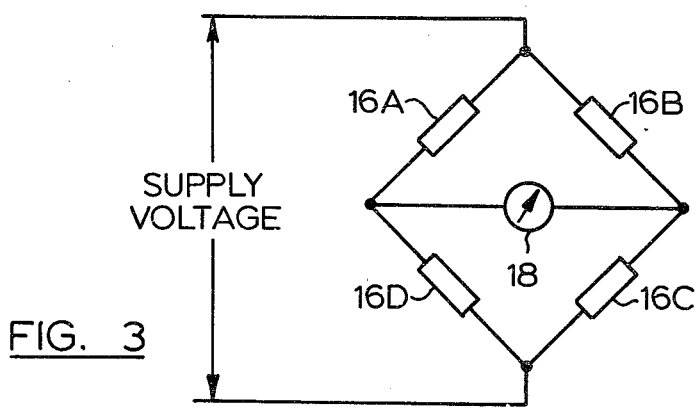

The plate 6 is supported by a bracket 10 on an arm 12, which is parallel to the plate and extends horizontally as a cantilever fashion from a bracket 14 rigidly secured to the housing 2. The arm 12 is of strip steel and has a substantial depth but is of relatively small thickness. It therefore resists vertical deflections but can deflect significantly in a horizontal plane in response to the horizontal reaction force from the material falling on the plate 6. Four identical variable resistance strain gauges are mounted in longitudinally spaced pairs 16A, 16B, 16C and 16D on opposite vertical sides of the arm 12 with respect to the horizontal reaction force. The gauges thus mounted respond to stresses acting on the plate perpendicular to the path of the material and to the longitudinal axis of the arm, when connected in a bridge circuit as shown in FIG. 3. A supply voltage is applied across the bridge, and any imbalance in the bridge is detected by means of a suitable measuring circuit 18 connected across the bridge. The arrangement is similar in many respects to that described in U.S. Pat. No. 3,650,340, which describes the application of a somewhat similar strain-gauge system to the top and bottom of a vehicle axle or drawbar to measure the load thereon; as explained in more detail in that patent, the degree of imbalance of the bridge, as indicated by the measuring circuit 18, is directly proportional to the load applied to the bar, in a plane perpendicular to that of the strain gauges; that load in the present case is any horizontal component of force acting on the plate 6 in a direction perpendicular to the arm 12. The output of the measuring circuit 18 measures the difference between the bending moment on the arm at two spaced location and is proportional to the horizontal component of the reaction to material falling on the plate and hence to the rate of flow of material into the housing 2. Steps will be taken in known manner to ensure that the material enters the entry 4 at a known velocity; for example a further fixed deflector plate may be situated in the conduit upstream of the flowmeter so as momentarily to arrest the solids whose flow rate is to be measured.

It will be appreciated that other strain gauge configurations could be employed provided that they are such as to respond essentially only to horizontal deflections of the arm 12. The proportions of the arm, which render it much more readily deflectible in the horizontal plane, assist considerably in discriminating between the horizontal and vertical components of forces applied to the plate. Instead of a single member as shown, the cantilever could comprise two or more plate members extending in parallel planes, so as further to enhance its horizontal flexibility relative to its vertical flexibility.

Figure 2:
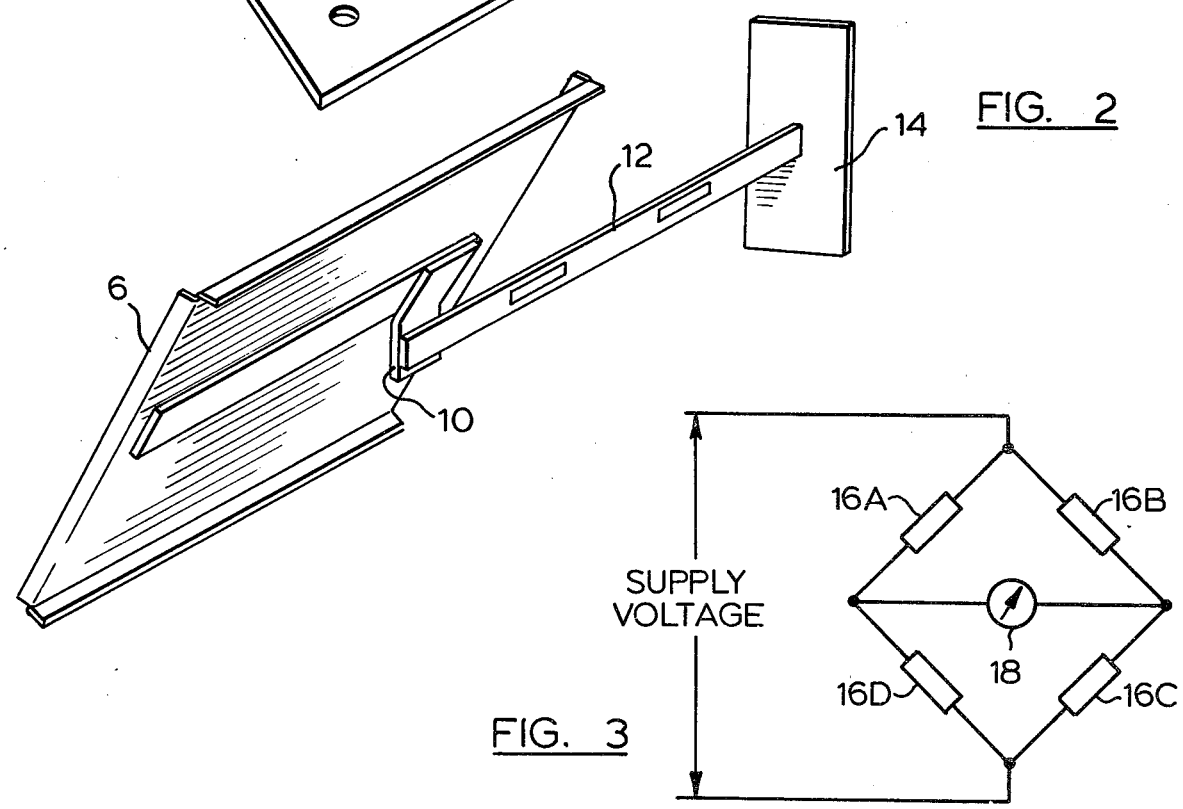

In FIG. 1, the arm 12 is shown attached to the bracket 10 at the far side of the plate 6 from the bracket 14. In some instances the arrangement shown in FIG. 2 may be preferred. For example, the installation may be such that the housing 2 does not provide a sufficiently rigid support for the bracket 14. In this case, the arm 12 may be attached to the bracket 10 so that the plate 6 extends away from the bracket 14, as shown in FIG. 2, and the arm may pass through an opening in the side of the housing to a location where the bracket 14 may be rigidly secured. If dusty material is being handled, it may be necessary to enclose that part of the arm extending beyond the housing within a suitable shroud.

The measuring circuit 18 and the voltage source for the strain gauges may be located remotely from the housing, thus avoiding any necessity for an equipment case adjacent the housing such as is required in conventional flowmeters. The installation and wiring of the strain gauges must of course be carried out in accordance with normal practice for the application of strain gauges, so as to avoid or cancel differential thermal effects and the pick-up of spurious signals, but the techniques required are well known in the strain gauge art and form no part of the present invention.

Whilst the plate has been described as mounted on a beam in the form of a cantilever arm, other arrangements could be used. For example, the beam could span the housing between sockets in its opposite walls, a bracket carrying the plate being connected to its centre point so that it forms two oppositely extending cantilevers.

Figure 4:
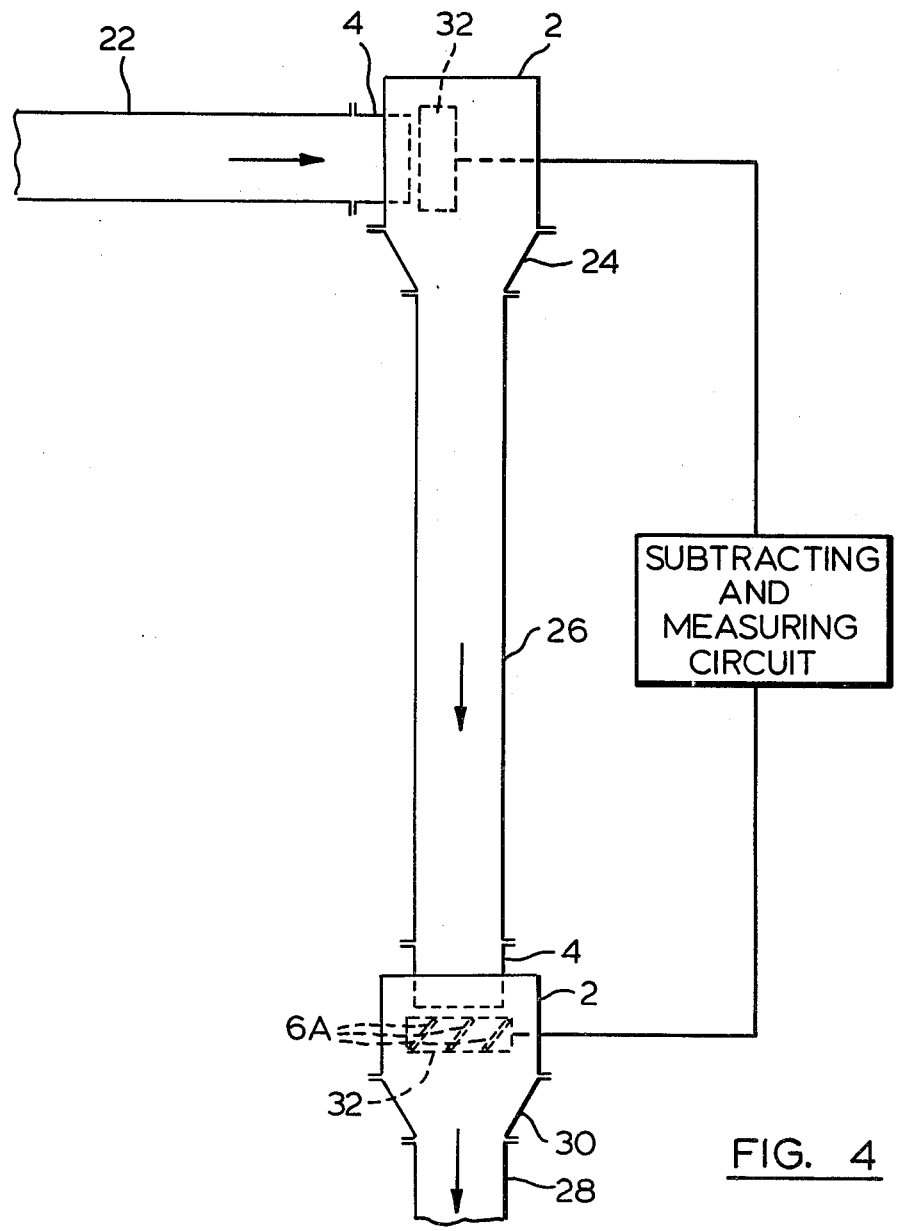

A flowmeter application in accordance with the invention is shown in FIG. 4. Problems have arisen in the past in metering the flow of air (or other gas) entrained solids because conventional inclined plate flowmeters react to the flow of both the gas and the solids. These flow rates may not remain in the same proportion. Moreover, the gas will normally have a higher velocity than the solids, although the relative velocities may vary according to the direction of flow. These difficulties can be overcome by use of the arrangement shown in FIGS. 4 and 5, in which a horizontal section 22 of the conduit carrying the gas entrained solids leads into a first flowmeter which may be arranged broadly as shown in FIG. 1 except that the housing is turned so that the entrance guide 4 is horizontal, and the side of the housing opposite the bracket 16 becomes the open base of the housing, which is connected by a tapered adapter 24 to a further vertical conduit section 26, which in turn is connected to the entrance guide 4 of a further flowmeter as shown in FIG. 1, which is connected to the remainder 28 of the conduit by an adapter 30. As can be seen from FIGS. 4 and 5, it is possible for the single inclined plate 6 shown in FIGS. 1 and 2 to be divided into a number of narrower parallel plates 6A mounted within a frame 32 so as to intercept material entering each housing 2 through the entry conduits 4. This arrangement permits a shallower structure, and facilitates interception of the solids when these are gas entrained, as in the present embodiment.

The lateral reaction of the plates 6A in the upper flowmeter in FIG. 4, will be proportional to the product of the rate of mass flow of the solids and their velocity plus the product of the rate of mass flow of the entraining gas and its velocity. Assuming that the conduit section 26 has the same cross section as the conduit section 22, the lateral reaction of the plates 6A in the lower flowmeter will be proportional to the product of the rate of mass flow of the solids and their initial velocity on leaving the upper flowmeter (which will be the same as that in the horizontal conduit) plus the product of the rate of mass flow of the entraining gas and its velocity (which will be the same as that in the horizontal conduit) plus the product of the rate of mass flow of the solids and their acceleration under the influence of gravity in falling from the upper to the lower flowmeter. Since the outputs from the strain gauge bridges in the two flowmeters will be proportional to the above reactions, subtraction of the outputs one from the other in a subtracting and measuring circuit 34 will provide an output proportional to the rate of mass flow of the solids, since the influence of gravity upon them is constant. A direct reading can therefore be obtained of the mass flow rate of the solids.

Figure 5:
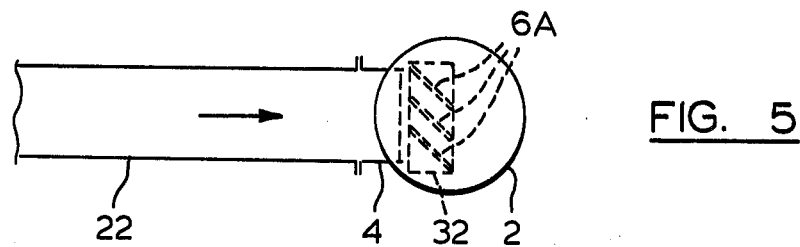

Whilst the general type of flowmeter described with reference to FIG. 1 is particularly suitable for use in the embodiment of FIGS. 4 and 5, it will of course be appreciated that other types of inclined plate flowmeters capable of responding to reactions perpendicular to the direction in which the flow enters the meter could be employed; for example, flowmeters as described in U.S. Pat. No. 3,640,135 already mentioned above, could be utilized.

What I claim is:

1. A flowmeter for particulate solids comprising a housing defining an entrance for a stream of particulate material, at least one plate situated in the housing downstream of the entrance so as to deflect the stream of material passing through the opening, the at least one plate being inclined relative to the direction of flow of said material through said entrance so as to sustain a reaction force having a component perpendicular to said flow direction, means supporting the at least one plate comprising at least one cantilever extending between said at least one plate and location fixed in relation to said housing so as to sustain said perpendicular reaction force component, each such cantilever extending perpendicularly relative to said force component, a transducer system comprising strain gauges mounted on said at least one cantilever in two longitudinally spaced pairs, the gauges in each pair being at opposite sides of the cantilever with respect to the direction of said perpendicular component, said gauge pairs being individually responsive to bending strains in the beam caused by said perpendicular force component and the gauges being electrically connected in a normally balanced bridge circuit such that imbalance of the bridge is proportional to said perpendicular force component, and means to measure such imbalance and hence the rate of flow of said solids.

2. A flowmeter according to claim 1, wherein the plate is rigidly attached to one end of the cantilever, and a rigid mounting is provided for the other end of the cantilever.

3. A flowmeter according to claim 2, wherein the rigid mounting is at the opposite side of the plate to the point of attachment of the beam to the plate.

4. A flowmeter according to claim 1, wherein the or each cantilever is a beam, and the depth of the beam in a direction parallel to the direction of motion of solids entering the meter is much greater than its thickness.

5. In a flowmeter for particulate solids comprising a plate inclined to the direction of flow of solids entering the flowmeter, and means to sense the magnitude of the reaction developed at said plate in a direction perpendicular to said direction of flow, the improvement comprising
cantilever means providing the sole restraint of movement of said plate in response to said reaction, and a transducer system mounted on said cantilever means, said transducer system comprising means to sense the difference between the bending moments on said cantilever means at two longitudinally spaced points.

6. A flowmeter according to claim 5, wherein the transducer system comprises two longitudinally spaced pairs of strain gauges, the strain gauges of each pair being mounted at opposite sides of the cantilever means, and the strain gauges are connected in a bridge circuit.

7. A flowmeter for gas entrained solids, comprising a horizontal conduit, a vertical conduit, a first housing of enlarged cross-section relative to said upper horizontal conduit connecting the upper horizontal conduit and the upper end of vertical conduit, a second housing of enlarged cross-section relative to said vertical conduit and connecting with the lower end of said vertical conduit, at least one deflection plate supported in said first housing and inclined so as to intercept solids entering the housing from the horizontal conduit and deflect them in a direction perpendicular to said horizontal and vertical conduits, at least one deflection plate supported in said second housing and inclined so as to intercept solids entering the housing and deflect them in a direction perpendicular to said vertical conduit, means to sense the magnitude of the horizontal reaction developed at the at least one deflection plate in the upper housing, means to sense the magnitude of the horizontal reaction developed at the at least one deflection plate in the lower housing, and means to measure the difference between said magnitudes.

8. A flowmeter according to claim 7, wherein rigidly anchored cantilever beams support the deflection plates in the first and second housings, and strain gauges are applied to the beams to sense the magnitude of the horizontal deflection forces applied thereto by the deflection plates.

* * * * *